United States Patent
Moffett (10) Patent No.: US 11,877,218 B1
(45) Date of Patent: Jan. 16, 2024

(54) MULTI-FACTOR AUTHENTICATION USING BIOMETRIC AND SUBSCRIBER DATA SYSTEMS AND METHODS

(71) Applicant: T-Mobile USA, Inc., Bellevue, WA (US)

(72) Inventor: David Moffett, Issaquah, WA (US)

(73) Assignee: T-Mobile USA, Inc., Bellevue, WA (US)

(*) Notice: Subject to any disclaimer, the term of this patent is extended or adjusted under 35 U.S.C. 154(b) by 359 days.

(21) Appl. No.: 17/374,651

(22) Filed: Jul. 13, 2021

(51) Int. Cl.
| | |
|---|---|
| H04W 4/50 | (2018.01) |
| H04W 4/60 | (2018.01) |
| H04W 4/80 | (2018.01) |
| H04W 12/06 | (2021.01) |
| H04L 9/40 | (2022.01) |
| H04W 12/08 | (2021.01) |
| H04W 12/40 | (2021.01) |
| H04W 12/69 | (2021.01) |

(52) U.S. Cl.
CPC ........... *H04W 4/50* (2018.02); *H04L 63/0861* (2013.01); *H04W 4/60* (2018.02); *H04W 4/80* (2018.02); *H04W 12/06* (2013.01); *H04W 12/08* (2013.01); *H04W 12/40* (2021.01); *H04W 12/69* (2021.01)

(58) Field of Classification Search
CPC ... H04W 4/38; H04W 4/50–90; H04W 76/60; H04L 63/0861
See application file for complete search history.

(56) References Cited

U.S. PATENT DOCUMENTS

| | | |
|---|---|---|
| 5,901,284 A | 5/1999 | Hamdy-Swink |
| 6,324,267 B1 | 11/2001 | Hraster et al. |
| 6,400,806 B1 | 6/2002 | Uppaluru |

(Continued)

FOREIGN PATENT DOCUMENTS

| | | |
|---|---|---|
| CN | 101467422 A | 6/2009 |
| CN | 101496059 A | 7/2009 |

(Continued)

OTHER PUBLICATIONS

Yury, Carrie "Your Heartbeat May Soon Be Your Only Password," Wired Partner Content, BeyondCurious, website URL <https://www.wired.com/insights/2014/06/heartbeat-may-soon-password/>, sourced Jul. 13, 2021, Best Available Date: Jun. 23, 2014.

(Continued)

*Primary Examiner* — San Htun
(74) *Attorney, Agent, or Firm* — Perkins Coie LLP (57) ABSTRACT

Systems and methods for granting access to a user to a resource associated with a telecommunications network based on network-based authentication combined with biometric authentication, such as using a cardiac signature. Heartbeat information is received from a user via a mobile device. When a match is determined between the heartbeat information and a stored cardiac signature that uniquely identifies the user, then the user is authenticated to use the mobile device. A second authentication is performed using subscriber identity module (SIM) information associated with the mobile device. Based on the first and second authentication, the user is granted access to a resource associated with the telecommunications network, such as resources provided by a telecommunications service provider or a third party.

20 Claims, 6 Drawing Sheets

(56) References Cited

U.S. PATENT DOCUMENTS

| | | | |
|---|---|---|---|
| 6,721,886 B1 | 4/2004 | Uskela | |
| 6,799,155 B1 | 9/2004 | Lindemann et al. | |
| 6,993,320 B1 | 1/2006 | Brune et al. | |
| 7,003,282 B1 | 2/2006 | Ekberg | |
| 7,107,248 B1 | 9/2006 | Asokan et al. | |
| 7,218,913 B2 | 5/2007 | Rousseau | |
| 7,308,431 B2 | 12/2007 | Asokan et al. | |
| 7,353,394 B2 | 4/2008 | Marmigere et al. | |
| 7,444,513 B2 | 10/2008 | Nyman et al. | |
| 7,542,569 B1 | 6/2009 | Leiwo | |
| 7,574,201 B2 | 8/2009 | Aaltonen et al. | |
| 7,613,481 B2 | 11/2009 | Aubert | |
| 7,954,141 B2 | 5/2011 | De et al. | |
| 7,961,883 B2 | 6/2011 | Bajar et al. | |
| 8,005,476 B2 | 8/2011 | Karaoguz et al. | |
| 8,090,944 B2 | 1/2012 | Lee | |
| 8,103,501 B2 | 1/2012 | Mumm et al. | |
| 8,151,322 B2 | 4/2012 | Chen et al. | |
| 8,151,328 B1 | 4/2012 | Lundy et al. | |
| 8,166,524 B2 | 4/2012 | Sentinelli | |
| 8,219,811 B2 | 7/2012 | Roundtree | |
| 8,509,844 B2 | 8/2013 | Venkataramu | |
| 8,577,414 B2 | 11/2013 | Rajadurai et al. | |
| 8,667,579 B2 | 3/2014 | Leeder | |
| 8,677,467 B2 | 3/2014 | Lincoln et al. | |
| 8,699,332 B2 | 4/2014 | Hogan et al. | |
| 8,737,964 B2 | 5/2014 | Koraichi | |
| 8,832,795 B2 | 9/2014 | Dowds et al. | |
| 8,868,915 B2 | 10/2014 | Counterman | |
| 9,020,564 B2 | 4/2015 | Zhang et al. | |
| 9,065,816 B2 | 6/2015 | Pollock | |
| 9,083,680 B2 | 7/2015 | Marsico | |
| 9,094,701 B2 | 7/2015 | Mildner et al. | |
| 9,112,905 B2 | 8/2015 | Mao et al. | |
| 9,113,334 B2 | 8/2015 | Agarwal et al. | |
| 9,184,913 B2 | 11/2015 | Froels et al. | |
| 9,253,188 B2 | 2/2016 | Bhasin et al. | |
| 9,380,038 B2 | 6/2016 | Ionescu et al. | |
| 9,462,452 B2 | 10/2016 | El Mghazli et al. | |
| 9,485,249 B2 | 11/2016 | Jeal et al. | |
| 9,705,871 B2 | 7/2017 | Engan et al. | |
| 9,716,999 B2 | 7/2017 | Zhang et al. | |
| 9,736,689 B2 | 8/2017 | Liu et al. | |
| 9,763,168 B1 | 9/2017 | Zait et al. | |
| 9,769,780 B2 | 9/2017 | El Mghazli et al. | |
| 9,800,578 B2 | 10/2017 | Wirtanen et al. | |
| 9,811,648 B2 | 11/2017 | Choi et al. | |
| 9,883,384 B2 | 1/2018 | Lee et al. | |
| 9,913,135 B2 | 3/2018 | Perold et al. | |
| 9,923,716 B2 | 3/2018 | El Mghazli et al. | |
| 10,027,642 B2 | 7/2018 | Le Huerou et al. | |
| 10,034,165 B2 | 7/2018 | Betti et al. | |
| 10,075,848 B2 | 9/2018 | Velusamy et al. | |
| 10,084,780 B2 | 9/2018 | Bao et al. | |
| 10,158,491 B2 | 12/2018 | Bonsignore | |
| 10,275,582 B2 | 4/2019 | Carlson | |
| 10,349,272 B2 | 7/2019 | Zhao et al. | |
| 10,362,617 B2 | 7/2019 | Serna et al. | |
| 10,492,070 B2 | 11/2019 | Stubblefield et al. | |
| 10,582,468 B2 | 3/2020 | Britt et al. | |
| 10,715,996 B1 | 7/2020 | Singh et al. | |
| 10,735,944 B2 | 8/2020 | Syed et al. | |
| 10,769,316 B2 | 9/2020 | Finger et al. | |
| 10,771,256 B2 | 9/2020 | Seegebarth | |
| 10,798,564 B2 | 10/2020 | Namiranian | |
| 10,917,790 B2 | 2/2021 | Li et al. | |
| 11,051,167 B2 | 6/2021 | Hancock et al. | |
| 2003/0069792 A1 | 4/2003 | Blumenthal | |
| 2004/0019564 A1 | 1/2004 | Goldthwaite et al. | |
| 2004/0122687 A1 | 6/2004 | Creamer et al. | |
| 2004/0158716 A1 | 8/2004 | Turtiainen et al. | |
| 2004/0215711 A1 | 10/2004 | Martin et al. | |
| 2006/0268838 A1 | 11/2006 | Larsson et al. | |
| 2007/0042754 A1 | 2/2007 | Bajikar et al. | |
| 2007/0234404 A1 | 10/2007 | Bogdanovic et al. | |
| 2007/0265006 A1 | 11/2007 | Washok et al. | |
| 2008/0031214 A1 | 2/2008 | Grayson et al. | |
| 2009/0082019 A1 | 3/2009 | Marsico | |
| 2010/0037308 A1 | 2/2010 | Lin et al. | |
| 2014/0135631 A1* | 5/2014 | Brumback | A61B 5/02438 600/479 |
| 2015/0035643 A1* | 2/2015 | Kursun | G07C 9/32 340/5.82 |
| 2015/0135310 A1* | 5/2015 | Lee | H04W 12/065 726/20 |
| 2015/0327065 A1 | 11/2015 | Mildh et al. | |
| 2016/0380999 A1 | 12/2016 | Tevlin | |
| 2017/0019789 A1* | 1/2017 | Rodzevski | G06F 21/35 |
| 2017/0118626 A1* | 4/2017 | Sadhu | G06F 16/1787 |
| 2017/0185762 A1* | 6/2017 | Chang | G06F 21/32 |
| 2017/0273612 A1* | 9/2017 | Kim | A61B 5/486 |
| 2018/0082304 A1 | 3/2018 | Summerlin et al. | |
| 2019/0069794 A1* | 3/2019 | Bardy | A61B 5/352 |
| 2020/0204565 A1 | 6/2020 | Zhong et al. | |
| 2020/0220865 A1 | 7/2020 | Finger et al. | |
| 2020/0351652 A1 | 11/2020 | LoreskÄr et al. | |
| 2021/0029127 A1 | 1/2021 | Stubblefield | |
| 2021/0084490 A1 | 3/2021 | Chikkala et al. | |

FOREIGN PATENT DOCUMENTS

| | | |
|---|---|---|
| CN | 101702806 A | 5/2010 |
| CN | 101242269 B | 12/2011 |
| CN | 102857910 A | 1/2013 |
| CN | 103685218 B | 9/2018 |
| CN | 112291064 A | 1/2021 |
| EP | 1075748 B1 | 5/2005 |
| EP | 1872188 A2 | 1/2008 |
| EP | 1942694 A1 | 7/2008 |
| EP | 2016544 A1 | 1/2009 |
| EP | 1176844 B1 | 6/2011 |
| EP | 2582115 B1 | 12/2015 |
| EP | 3040922 A1 | 7/2016 |
| EP | 3165013 A1 | 5/2017 |
| EP | 3289509 B1 | 9/2020 |
| KR | 100559958 B1 | 3/2006 |
| KR | 101126775 B1 | 4/2012 |
| KR | 101351457 B1 | 1/2014 |
| KR | 101351458 B1 | 1/2014 |
| KR | 101569364 B1 | 11/2015 |
| WO | 0149054 A1 | 7/2001 |
| WO | 0237323 A1 | 5/2002 |
| WO | 03073783 A1 | 9/2003 |
| WO | 2004010720 A1 | 1/2004 |
| WO | 2009040761 A2 | 4/2009 |
| WO | 2009152749 A1 | 12/2009 |
| WO | 2010010800 A2 | 1/2010 |
| WO | 2012075873 A1 | 6/2012 |
| WO | 2014032549 A1 | 3/2014 |
| WO | 2018004600 A1 | 1/2018 |
| WO | 2018030349 A1 | 2/2018 |
| WO | 2019191362 A1 | 10/2019 |

OTHER PUBLICATIONS

Russey, Cathy "This Smart Bracelet Uses Your Heartbeat to Authenticate Access," Wearable Technologies, Jan. 25, 2019, website URL <https://www.wearable-technologies.com/2019/01/this-smart-bracelet-uses-your-heartbeat-to-authenticate-access/>, sourced Jul. 13, 2021.
Harvard Health Publishing "Heart rhythm monitoring with a smartwatch," Harvard Medical School, Apr. 1, 2019, website URL <https://www.health.harvard.edu/heart-health/heart-rhythm-monitoring-with-a-smartwatch>, sourced Jul. 13, 2021.
"Samsung's Smartwatch: Your Heartbeats Will Unlock Your Next Smartphone," What A Future!, Mar. 17, 2015, website URL <http://www.whatafuture.com/heartbeat-authentication-in-samsung-smartwatch/>, sourced Jul. 13, 2021.

* cited by examiner

MULTI-FACTOR AUTHENTICATION USING BIOMETRIC AND SUBSCRIBER DATA SYSTEMS AND METHODS

BACKGROUND

User authentication can involve proving the identity of a user of a system, such as a computing system or network. For example, a user can be given access to secure systems or resources based on user credentials that imply authenticity, such as a password, personal identification number (PIN), key card, or other access device to allow access. Such credentials can increase the likelihood that a user is authentic, but authenticity is not guaranteed. For example, passwords can be guessed, stolen, or improperly shared, access devices can be stolen or faked, and so forth.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Telecommunications service providers supply or facilitate access to many secure resources, such as network resources, subscriber or account information, secure websites, services provided to subscribers by the service provider and/or third parties, and so forth. Access to these resources can be limited to only authorized users who must prove their identity to receive access, such as subscribers, employees, contractors, or other individuals associated with the telecommunications service provider. But existing technologies can be inaccurate when attempting to ascertain a user's identity or can otherwise inconvenience users. For example, password-based security can prevent access by authorized users if a user forgets or mistypes a password, or grant access to unauthorized users if a password is stolen or guessed. It is estimated that approximately 40% of password entries fail on the first try, e.g., because a user enters an incorrect password. And even certain biometric-based security, by itself, can misidentify users or otherwise be hacked. For example, security based on facial recognition can be inaccurate for certain races or nationalities, and fingerprint readers can allow access to unauthorized users using molds or other fake fingerprints. Thus, existing technologies are inefficient, and they fail users by preventing authorized access and/or allowing unauthorized access.

Accordingly, there is a need for a solution that overcomes the foregoing technical problems and provides other benefits. For example, there is a need for a technical solution that provides more reliable authentication of users based on authentication factors that are difficult to steal or fake. In addition, there is a need for a technical solution that reduces user inconvenience, such as a technical solution that does not require memorization of passwords or personal identification numbers (PINs).

Disclosed herein are systems and related methods for providing secure access to resources associated with a telecommunications network using network-based authentication, such as authentication of a device using SIM information, in combination with biometric authentication, such as authentication based on a cardiac signature ("system" or "heartbeat authentication system"). A cardiac signature can uniquely identify a person based on identifying features of the person's measured heartbeat. A cardiac signature can be, for example, recorded and/or measured electrical activity generated by a person's heart, which is unique to an individual. A cardiac signature can be used to uniquely identify a person and cannot be changed by the person, which allows for enhanced and reliable identification (e.g., based on characteristics of the electrical activity, such as temporal, amplitude, and/or morphological features). For example, using the disclosed system, a telecommunications service provider that provides the network can authenticate the identity of a subscriber or other user by matching a received heartbeat for the user to a stored cardiac signature that uniquely identifies the user. The disclosed system can also determine that the user is in possession of a device, such as a mobile device associated with the user, via which the user accesses the telecommunications network, and perform a device authentication to allow the user to access a resource associated with the telecommunications network. Thus, the user is authenticated reliably and conveniently using at least two factors, including the user's cardiac signature (or other biometric identifier) and possession of the user's mobile device.

The user's heartbeat can be detected, for example, using a wearable device such as a smartwatch that is communicatively coupled to the user's mobile device. For example, the user's heartbeat can be measured using one or more sensors in a smartwatch, and these measurements can be used to match the user's heartbeat to a stored cardiac signature. Furthermore, a Bluetooth or other connection between the smartwatch and the mobile device can be detected to determine that the user is in physical possession of the user's mobile device. In some implementations, these multiple factors can be combined with other authentication factors or processes, such as authentication based on further biometric indicators (e.g., facial recognition, iris scanning, fingerprint scanning, etc.), passwords, PINs, personal identifying information of a user, and so forth. For example, the user and/or the telecommunications service provider can configure an appropriate combination of authentication factors based on a level of security for a resource, a set of preferred authentication factors, and so forth.

After authenticating a user based at least on matching the user's heartbeat to a stored cardiac signature and possession of the user's device, the heartbeat authentication system can provide or approve access to a resource associated with the telecommunications network. In some implementations, the resource is a service provided by the telecommunications service provider, such as voice calling, messaging (e.g., Short Message Service (SMS) messaging, Rich Communication Service (RCS) messaging, and so forth), video calling, mobile data transmission, and so forth. In some implementations, the resource is provided by a third party, such as a business partner associated with the telecommunications service provider. For example, the telecommunications service provider can partner with third-party organizations to provision rewards or incentives that require proof of the user's identity.

In some implementations, the heartbeat authentication system can be used to secure one or more devices, such as mobile devices associated with subscribers of a telecommunications service provider. In such implementations, a device can be disabled unless a user is authenticated based on the user's cardiac signature.

Advantages of the system include increased accuracy of user authentication, and, correspondingly, reduced likelihood of granting unauthorized access to resources. In addition, the disclosed system can authenticate a user without requiring a password or PIN. Thus, the system is more convenient for users, and less likely to prevent authorized access or grant unauthorized access to resources.

For purposes of illustration, the following description includes implementations wherein the system authenticates a user based on a cardiac signature in combination with authentication based on SIM information associated with a device. However, a person of ordinary skill in the art will understand that alternative implementations are within the scope of the present disclosure, such as implementations that use other forms of biometric identification in addition to or as an alternative to authentication using a cardiac signature. For example, a user may additionally or alternatively be authenticated based on a fingerprint, facial recognition, voice recognition, gait measurement or detection, hand or palm shape, handwriting analysis, iris or other eye scanning, or any other biometric characteristic by which a person can be identified.

In the following description, for purposes of explanation, numerous specific details are set forth in order to provide a thorough understanding of implementations of the present technology. The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Suitable Environments

Figure 1:
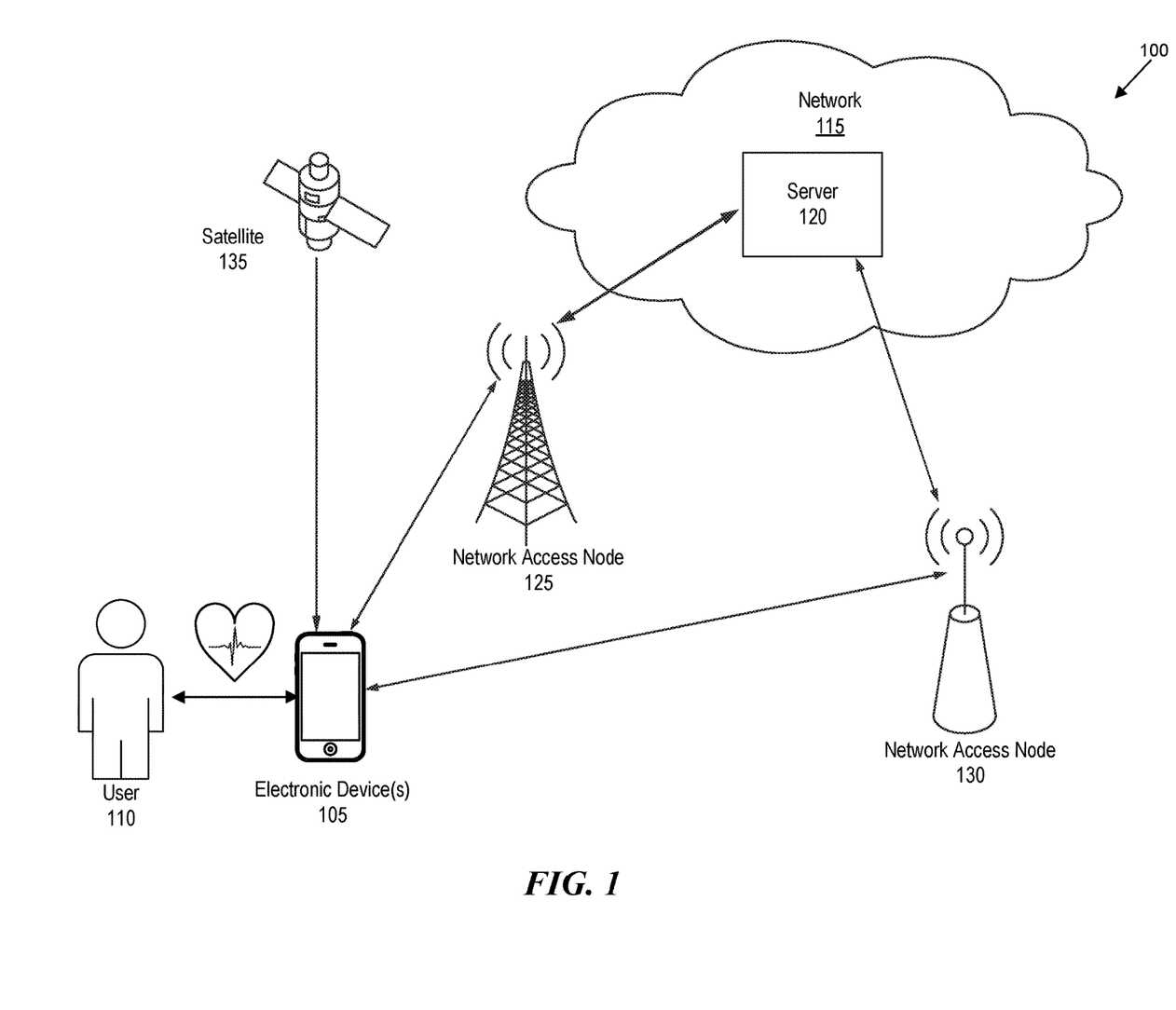
FIG. 1 is a block diagram illustrating a suitable computing environment within which a system for providing secure access to resources using a cardiac signature operates.

FIG. 1 is a block diagram illustrating a suitable environment 100 within which a system for providing secure access to resources associated with a telecommunications network using a cardiac signature operates. The environment 100 includes one or more electronic devices 105 via which a user 110 accesses one or more networks 115, such as telecommunications networks. Electronic devices 105 can include, without limitation, mobile devices or other user equipment (UE) associated with users, such as smartphones or other mobile phones, tablet computers, laptop computers, desktop computers, wearable devices, and so on. Networks 115 can include wired or wireless, public or private, networks including, for example, the internet. At least a portion of the networks 115 comprise one or more telecommunications networks provided by a telecommunications service provider having users who are subscribers associated with electronic devices 105. To provide features of the network, telecommunications service providers use one or more servers 120, which can be used to provide all or portions of the heartbeat authentication system.

Users 110 use electronic devices 105 to access the network 115 via base stations 125, network access nodes 130, and/or satellites 135. A base station is a type of network access node (NAN) that can also be referred to as a cell site, a base transceiver station, or a radio base station. The environment 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point. Users 110 can be, for example, subscribers, employees, or contractors of the telecommunications service provider.

Electronic devices 105 are used to send and receive calls, texts or other messages (e.g., Short Message Service (SMS) or Rich Communication Services (RCS) messages), and other data via networks 115. In addition, users 110 can use electronic devices 105 to access various resources via or associated with the network 115. These resources can be, for example, resources of a telecommunications service provider that operates all or portions of the network 115, such as telecommunications services, secure websites, computing resources, account information, and so forth. Additionally or alternatively, these resources can be provided by third parties associated with or partnering with the telecommunications service provider, such as third-party websites or accounts. Whether associated with a telecommunications service provider or a third party, resources can be virtual or physical resources. For example, the heartbeat authentication system can be used to grant access to an online account or to a physical facility (e.g., by unlocking a door). Non-limiting examples of resources to which the system can grant access further include devices (e.g., mobile devices, computers, accessory devices, etc.), device resources, and websites or applications (e.g., for banking, shopping, etc.).

To detect heartbeats or other biometric information and generate corresponding signatures of users 110, electronic devices 105 include or are coupled to sensors, such as a heart monitor. In a non-limiting example, a user 110 is associated with a mobile device (e.g., a smartphone), and the user 110 wears a wearable device (e.g. a smartwatch) that connects to the mobile device (e.g., via Bluetooth). The wearable device includes one or more sensors that can detect the user's heartbeat to generate a cardiac signature and/or to match the detected heartbeat to a stored or received cardiac signature that uniquely identifies the user. The one or more sensors included in the wearable device can comprise, for example, a heart monitor comprising a set of electrodes used to produce an electrocardiogram (ECG) of the user's heartbeat. Additionally or alternatively, the one or more sensors can include other sensors for measuring and/or detecting a user's heartbeat, such as one or more light sources (e.g., light-emitting diodes (LEDs)) and one or more photodiodes or other light-sensitive sensors that detect blood flow under a person's skin based on reflected light, e.g., using photoplethysmography (PPG).

In an example use case, a user 110 is a subscriber of a telecommunications service provider and uses a smartphone to access services provided via one or more networks of the telecommunications service provider, such as calling, messaging, and data services. The subscriber can use the heartbeat authentication system as a security feature to prevent unauthorized access to his or her smartphone and/or to deter theft of the smartphone. The user couples the smartphone to a smartwatch having a heart monitor. Using the heart monitor, the user records a sample of his or her heartbeat (e.g., a tenth of a second, a second, several seconds, one minute, etc.), which is captured and/or expressed as an ECG and/or using other methods to characterize a heartbeat, such as PPG. The heartbeat authentication system analyzes the recorded heartbeat sample and identifies a set of features that uniquely identify the user. For example, ECG can be used to analyze a heartbeat based on various waves and associated intervals, such as P-waves, Q-waves, R-waves, S-waves, and T-waves, or combinations thereof. The foregoing waves or any combination thereof can be further analyzed based on temporal relationships (e.g., intervals), amplitude, and/or morphological features (e.g., shapes, slopes, angles, etc.). These features can be expressed as one or more calculated variable values, such as frequency variables, count variables, amplitude variables, and/or ratios of wave features. This set of features is then stored by the system as a cardiac signature. To subsequently access the user's smartphone, the user must provide a heartbeat reading via the smartwatch, and the system determines that the heartbeat reading matches the stored cardiac signature for the user. If the heartbeat reading does not match the cardiac signature or if no heartbeat reading is received (e.g., because the smartphone is not connected to the smartwatch or because the user is not wearing the smartwatch) then the system can take one or more actions to prohibit unauthorized access to the smartphone and/or network resources, such as by disabling the smartphone, terminating access to the network, and so forth.

In another example use case, the heartbeat authentication system can be used by the telecommunications service provider to authenticate a subscriber to access a service provided by a third party. For example, the subscriber can be a customer of a bank. The subscriber calls the bank using a smartphone coupled to a smartwatch worn by the subscriber. Rather than providing information to the bank over the phone (e.g., identifying information, account numbers, passcodes, card numbers, etc.) to access bank account information or services, the bank can instead receive an indication from the telecommunications service provider that the subscriber has been authenticated via the heartbeat authentication system based on the subscriber's heartbeat detected at the smartwatch and based on the subscriber's possession of his or her smartphone.

For purposes of illustration, the environment 100 depicts a single user 110 associated with an electronic device 105 at which the user's heartbeat is received and/or detected. For example, a single user 110 may be associated with a single computing device capable of detecting the user's heartbeat via a heart monitor or other sensor. However, a person skilled in the art will appreciate that various combinations of users 110 and electronic devices 105 are possible. For example, the heartbeat authentication system can be configured to associate multiple users 110 with a single electronic device 105 or set of electronic devices, e.g., where multiple users share a device. Additional or alternatively, electronic devices 105 can comprise a set of coupled electronic devices, such as a mobile device coupled to one or more wearable devices (e.g., a smartwatch and/or smartglasses, and so forth).

FIG. 1 and the discussion herein provide a brief, general description of a suitable environment 100 in which the heartbeat authentication system can be supported and implemented. Although not required, aspects of the system are described in the general context of computer-executable instructions, such as routines executed by a computer, e.g., a mobile device, a server computer, or a personal computer. The system can be practiced with other communications, data processing, or computer system configurations, including: internet appliances, handheld devices (including tablet computers and/or personal digital assistants (PDAs)), Internet of Things (IoT) devices, all manner of cellular or mobile phones, multi-processor systems, microprocessor-based or programmable, consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet-switched, circuit-switched, or other scheme). Portions of the system can reside on a server computer, while corresponding portions can reside on a client computer such as a mobile or portable device, and, thus, while certain hardware platforms are described herein, aspects of the system are equally applicable to nodes on a network. In alternative implementations, the mobile device or portable device can represent the server portion, while the server can represent the client portion.

In some implementations, one or more of the electronic devices 105 and/or cell sites associated with a telecommunications network accessed by the electronic devices 105 can include network communication components that enable the devices to communicate with remote servers or other portable electronic devices by transmitting and receiving wireless signals using a licensed, semi-licensed, or unlicensed spectrum over a communications network, such as networks 115. In some cases, the networks 115 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the electronic device is configured to operate and switch among multiple frequency bands for receiving and/or transmitting data.

Heartbeat Authentication System

Figure 2:
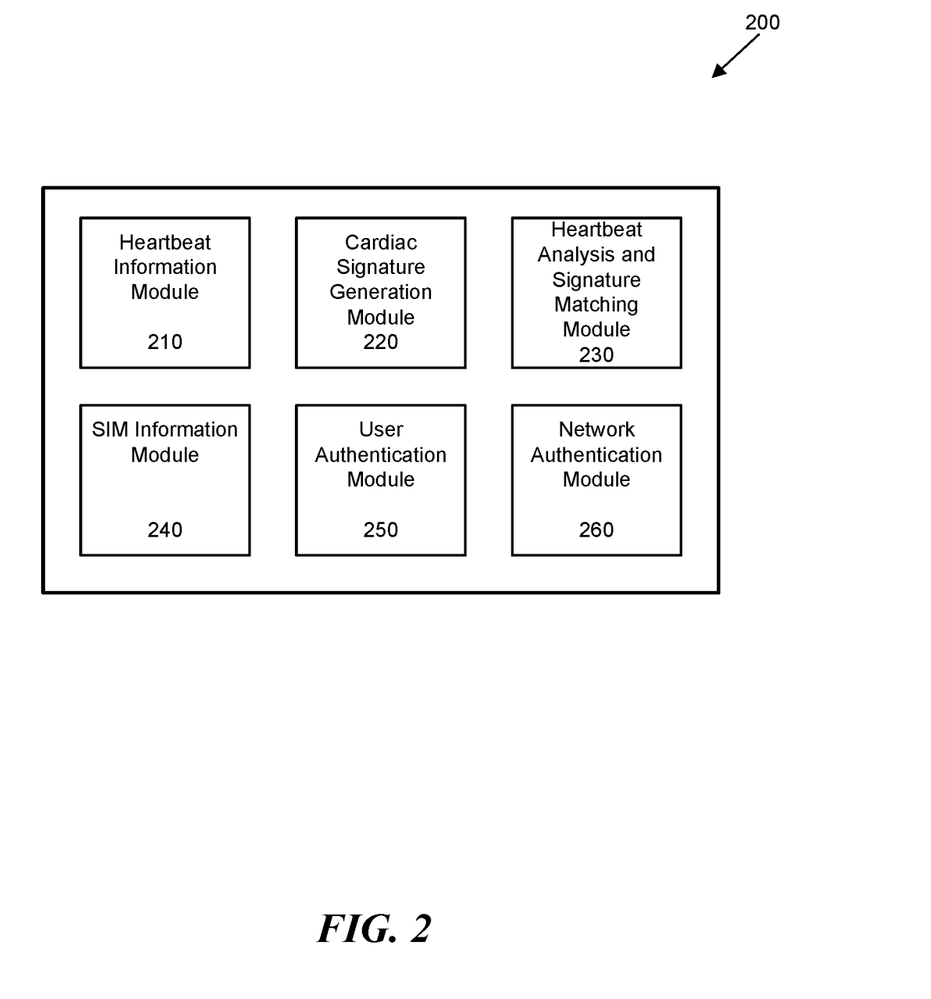
FIG. 2 is a block diagram illustrating components of a system for providing secure access to resources using a cardiac signature.

FIG. 2 is a block diagram illustrating components of a heartbeat authentication system 200. The system 200 can be provided, for example, by a telecommunications service provider that provides all or portions of networks 115 using servers 120. Additionally or alternatively, portions of the system 200 may reside on or be provided via electronic devices 105 associated with subscribers or other users 110 associated with the telecommunications service provider, such as via one or more software applications installed on electronic devices 105 (e.g., on a smartphone or other mobile device and/or a smartwatch or other wearable device).

The heartbeat authentication system 200 can include functional modules that are implemented with a combination of software (e.g., executable instructions or computer code) and hardware (e.g., one or more memories and one or more processors). Accordingly, as used herein, in some examples a module is a processor-implemented module or set of code, and represents a computing device having a processor that is at least temporarily configured and/or programmed by executable instructions stored in memory to perform one or more of the functions described herein. For example, the heartbeat authentication system can include a heartbeat information module 210, a cardiac signature generation module 220, a heartbeat analysis and signature matching module 230, a subscriber identification module (SIM) module 240, a user authentication module 250, and a network authentication module 260, which are each discussed separately below.

Heartbeat Information Module

The heartbeat information module 210 is configured and/or programmed to access/receive/store/process heartbeat information, such as recorded and/or detected heartbeats, which may be expressed or represented as electrical signals measured via one or more sensors in contact with a person, such as using ECG. In some implementations, heartbeat information is detected/stored/measured, additionally or alternatively, using other technologies, such as PPG. Heartbeat information can be used, for example, to generate, by the heartbeat information module 210, one or more training datasets to train models (e.g., machine learning models) to generate cardiac signatures (e.g., by the cardiac signature generation module 220) and/or to determine a match between received heartbeat information and a cardiac signature (e.g., by the heartbeat analysis and signature matching module 230).

Heartbeat information for an individual can be analyzed using ECG for one or more of a P-wave, a Q-wave, a R-wave, a S-wave, a T-wave, and/or a U-wave, and for various combinations thereof, such as intervals or complexes. For example, a QRS complex is a combination of three deflections seen on a typical ECG based on respective Q-, R-, and S-waves, which reflects a single event that can be considered together. A Q-wave is any downward deflection immediately following the P-wave. An R-wave follows as an upward deflection, and the S-wave is any downward deflection after the R wave. The T-wave follows the S-wave, and in some cases, an additional U-wave follows the T-wave. Heartbeat information stored by the heartbeat information module 210 can include ECGs for one or more users and/or characteristics of user heartbeats based on any combination of the foregoing waves and/or calculated variable values, intervals, amplitudes, and so forth, as well as identifying information for respective users (e.g., names or other identifiers). These characteristics can be used, for example, to store/generate one or more training datasets to train machine learning models to generate cardiac signatures and/or determine matches between received heartbeat information and cardiac signatures.

Cardiac Signature Generation Module

The cardiac signature generation module 220 is configured and/or programmed to analyze a received heartbeat signal and generate a corresponding cardiac signature that uniquely identifies the user whose heartbeat signal is received. The received heartbeat signal can be received as or analyzed to generate an electrocardiogram (ECG) of the user's heartbeat and/or using other methods of detecting/measuring a heartbeat, such as PPG. The cardiac signature generation module 220 analyzes the heartbeat signal and extracts identifying features. For example, the received heartbeat signal can be analyzed using ECG to identify various waves, such as a P-wave, a Q-wave, a R-wave, a S-wave, and a T-wave, as is known in the art, including identifying amplitudes and relative positions for each. This can include, for example, measuring one or more of the foregoing waves relative to the peak of a wave, such as amplitude and/or temporal difference as compared to an R-wave peak. In some implementations, the received heartbeat signal can be normalized, for example, based on a predetermined frequency or duration (e.g., adjusted to 40 bpm, 60 bpm, 80 bpm, 100 bpm, etc.). Any combination of the foregoing waves can be analyzed to extract various features that, when combined, uniquely identify a person. These features can include, for example, absolute or relative amplitudes of each wave, intervals or other temporal relationships between one or more waves, morphological features (e.g., shapes, slopes, angles, etc.), or any combination thereof. The foregoing features can be expressed and/or calculated, for example, as one or more variable values, such as frequencies, counts, ratios, intervals, and so forth. In some implementations, the identifying features that are extracted are determined using one or more trained machine learning models that identify features that can uniquely identify a person. In these and other implementations, the extracted identifying features are stored as a cardiac signature.

Heartbeat Analysis and Signature Matching Module

The heartbeat analysis and signature matching module 230 receives heartbeat information and determines whether the received heartbeat information matches a stored cardiac signature beyond a threshold probability. The heartbeat information is received from one or more sensors that measure a heartbeat of a user, such as a set of electrodes that measure electrical signals to generate an ECG. The heartbeat analysis and signature matching module 220 then analyzes the received heartbeat information. For example, received heartbeat information can be analyzed like a cardiac signature, as described above in relation to the cardiac signature generation module, based on any combination of a P-wave, a Q-wave, a R-wave, a S-wave, a T-wave, and/or a U-wave, and/or one or more complexes, intervals, amplitudes, morphological features, calculated variable values, and/or other characteristics. Based on this analysis, the heartbeat analysis and signature matching module 230 determines whether the received heartbeat information matches a stored cardiac signature of a known user beyond a threshold probability (e.g., 70%, 80%, 90%, etc.). In some implementations, matching received heartbeat information and a stored cardiac signature can be performed using one or more machine learning models. In these and other implementations, determining a match can be based on calculating one or more confidence scores, such as numerical scores reflecting a likelihood that received heartbeat information is associated with a user corresponding to a stored cardiac signature. If a match is found, then the heartbeat analysis and signature matching module determines that the user who provided the heartbeat information is the same person who is associated with the cardiac signature.

SIM Information Module

The subscriber identification module (SIM) information module 240 stores and/or accesses and/or processes SIM information associated with one or more mobile devices, such as international mobile subscriber identity (IMSI) numbers and their related keys and/or integrated circuit card identifiers (ICCIDs), and/or Mobile Station International Subscriber Directory Number (MSISDN) information, which are used to identify and authenticate subscribers on mobile devices. The SIM information can be associated with mobile devices, such as smartphones and/or wearable devices. SIM information can be associated with one or more SIM cards present in the mobile devices and/or eSIM profiles associated with the mobile devices. In some implementations, the SIM information module 230 and/or other components of the system 200 can receive/store/access other information associated with a device or a subscriber, such as contact information (e.g., phone numbers, addresses, email addresses, etc.), identifying information (e.g., names, ages, social securities numbers or other identifiers), other personal information or device information, account information (e.g., associated with the telecommunications service provider or a third-party service), and so forth. Information stored/accessed by the SIM information module can be used to authenticate a user and/or a device (e.g., by the user authentication module 250 and/or the network authentication module 260), or to otherwise verify information associated with a user. For example, information stored/accessed by the system 200 can be used to verify a user's credit history or credit score and/or other personal information associated with the user.

User Authentication Module

The user authentication module 250 authenticates a user based on a determined match between heartbeat information received from the user and a stored cardiac signature of a known user. The match can be determined, for example, by the heartbeat analysis and signature matching module 230, as described herein above. In some implementations, a device or resource can be accessible only by a specific user (e.g., a mobile device associated with a subscriber of a telecommunications service provider), in which case the user authentication module 250 authenticates the user to access the device or resource only if that specific user's cardiac signature is matched to the received heartbeat information. In some implementations, a set of users are each authorized to access a device or resource. In such implementations, each user in the set of users is associated with a cardiac signature, and the user authentication module 250 authenticates a user to access the device or resource if any one of the set of cardiac signatures is matched to received heartbeat information.

In some implementations, the user authentication module 250 authenticates users to different sets of resources and/or devices based on stored user profiles. For example, the user authentication module 250 can authenticate parents to access resources of a device, but only authenticate children to access a subset of those same resources, based on detecting each person's respective cardiac signature and associating the cardiac signature to different levels of access. In some implementations, users can be employees or contractors of a telecommunications service providers, and different levels of access can be provided to different categories or classes of users, such as employee users, contractor users, administrator users, and so forth.

The system 200 can be configurable in other ways as well, such as by granting or denying user access based on dates and/or times, and so forth. For example, in the implementation described above where the system 200 grants different access to parent users as compared to child users, a child's access may be limited to certain times of the day and/or days of the week (e.g., to exclude access during the school day, after bed time, during dinner, etc.).

Network Authentication Module

The network authentication module 260 authenticates or requests authentication of a device to access a network, such as a telecommunications network, based on device information, such as SIM information stored in or accessed by the SIM information module 240. For example, the network authentication module 260 can retrieve an IMSI and/or an authentication key (K) from the SIM information module 240 and use these to request access and authentication to a telecommunications network. In some implementations, the network authentication module 260 can be prevented from requesting or performing authentication if a user authentication performed by the user authentication module 250 has not been completed or has failed. Thus, the heartbeat authentication system can prevent access to network resources and/or resources associated with a network (e.g., third-party resources) if a user has not been authenticated based on the user's cardiac signature.

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, models trained by the system 200 can include a neural network with multiple input nodes that receive training datasets. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer ("the output layer"), one or more nodes can produce a value classifying the input that, once the model is trained, can be used to generate a cardiac signature, determine a match between heartbeat information and a cardiac signature, and so forth. In some implementations, such neural networks, known as deep neural networks, can have multiple layers of intermediate nodes with different configurations, can be a combination of models that receive different parts of the input and/or input from other parts of the deep neural network, or are convolutions —partially using output from previous iterations of applying the model as further input to produce results for the current input.

A machine learning model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new data, such as heartbeat information.

Training of Machine Learning Model

Figure 3:
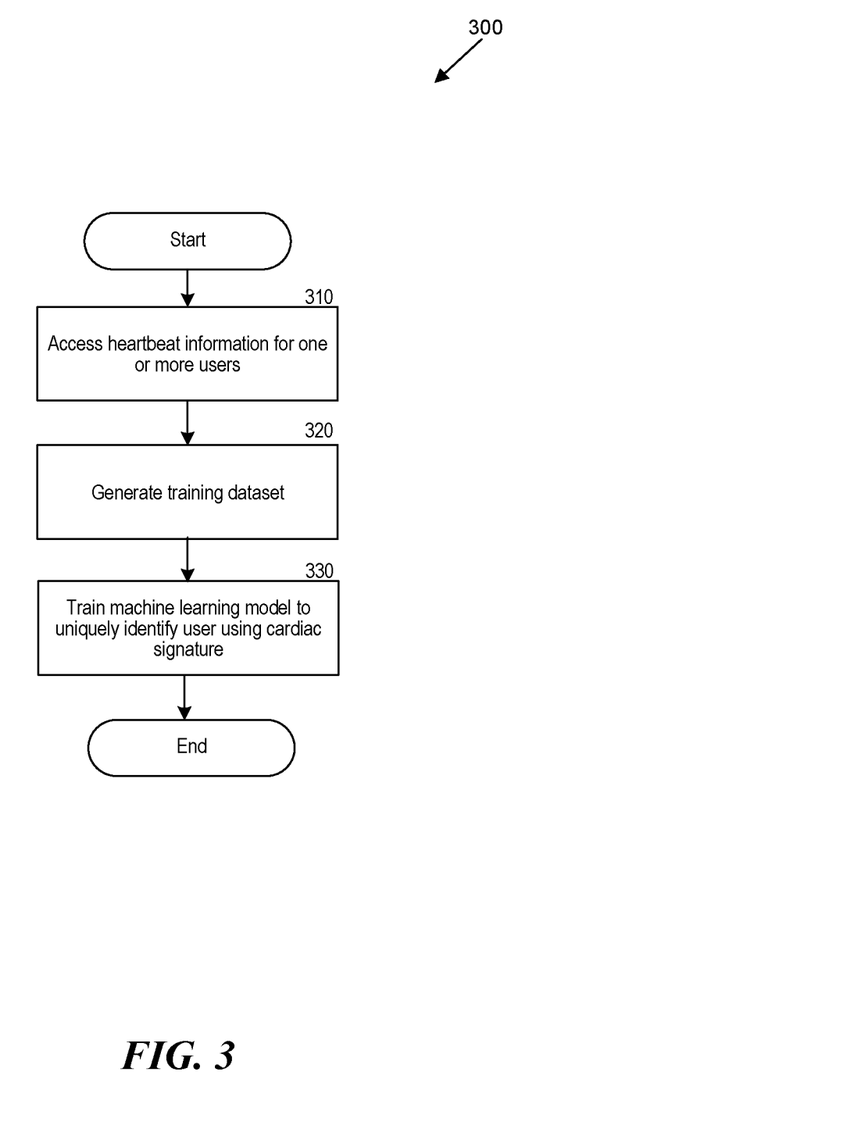
FIG. 3 is a flow diagram illustrating a process for training a machine learning model to uniquely identify a user using a cardiac signature.

FIG. 3 is a flow diagram illustrating a process 300 for training a machine learning model to generate cardiac signatures that uniquely identify users and/or to determine matches between such cardiac signatures and received heartbeat information.

The process 300 begins at block 310, where heartbeat information is received and/or accessed for one or more users. The heartbeat information can be received as and/or analyzed to generate an ECG for heartbeat information of each user. The heartbeat information further includes, for each user, identifying information, such as a name, subscriber identifier (e.g., phone number, user name, IMSI, MSISDN, etc.), or other identifier. The heartbeat information can, additionally or alternatively, include other heartbeat measurements/signals, such as PPG. In some implementations, the information received at block 310 can, additionally or alternatively, include other biometric information for a user, such as fingerprint information, iris scan(s), gait information, facial detection (e.g., in a photograph or other images), voice information (e.g., audio of a user speaking), and so forth. The heartbeat information can be received by and/or accessed from, for example, the heartbeat information module 210 of FIG. 2.

The process 300 then proceeds to block 320, where a training dataset is generated using the heartbeat information and/or other information received/accessed at block 310. Generating a training dataset includes identifying users and associated heartbeat information for each user. For each user, identifying features are extracted from the heartbeat information. For example, ECG information is analyzed to identify a P-wave, a Q-wave, a R-wave, a S-wave, a T-wave, and/or a U-wave. The analyzed ECG information can be further processed, for example, to generate one or more calculated variable values, which can include intervals and/or amplitude relationships between any combination of the foregoing waves, wave complexes (e.g., a QRS complex), slopes, morphological features, and so forth. Training datasets can be generated and/or stored, for example, by the heartbeat information module 210 of FIG. 2.

The process 300 then proceeds to block 330, where a machine learning model is trained using the training dataset generated at block 320. As described herein above, non-limiting examples of models that can be trained include neural networks, support vector machines, decision trees, Parzen windows, Bayes, clustering, reinforcement learning, probability distributions, decision trees, decision tree forests, and so forth. The machine learning model can be trained, for example, by the cardiac signature generation module 220 and/or the heartbeat analysis and signature matching module 230 of FIG. 2. Based on the training, the machine learning model is able to uniquely identify a user based on heartbeat information. For example, the machine learning model can be trained to generate cardiac signatures that include features of user heartbeat information that can be used to differentiate the user from other users beyond a threshold probability. This threshold probability can be based on, for example, generated numerical scores. Accordingly, the machine learning model can be trained to assess matches between cardiac signatures, such as by generating a cardiac signature for received heartbeat information and comparing the generated cardiac signature to a stored cardiac signature of a known user.

In some implementations, the process 300 can further include testing the machine learning model. For example, a portion of the heartbeat information (e.g., 10%) received and/or accessed at block 310 can be excluded from the training dataset and used as test data to assess the accuracy of the trained machine learning model. The trained machine learning model is applied to the test data to determine whether the model correctly generates cardiac signatures and/or assesses matches between heartbeat information and stored cardiac signatures with an accuracy beyond a threshold level (e.g., 70%, 80%, 90%, etc.). If the trained machine learning model does not exceed the threshold accuracy when applied to the test data then the model can be retrained or discarded in favor of a more accurate model. Assessing the model can include, for example, manually reviewing results to see whether the trained model can generate a cardiac signature sufficient to differentiate a user from other users.

Retraining the machine learning model can include training the model at least a second time using the same training dataset, training the model with a different (e.g., expanded) training dataset, applying different weights to a training dataset, rebalancing a training dataset, and so forth.

Generation of Cardiac Signature

Figure 4:
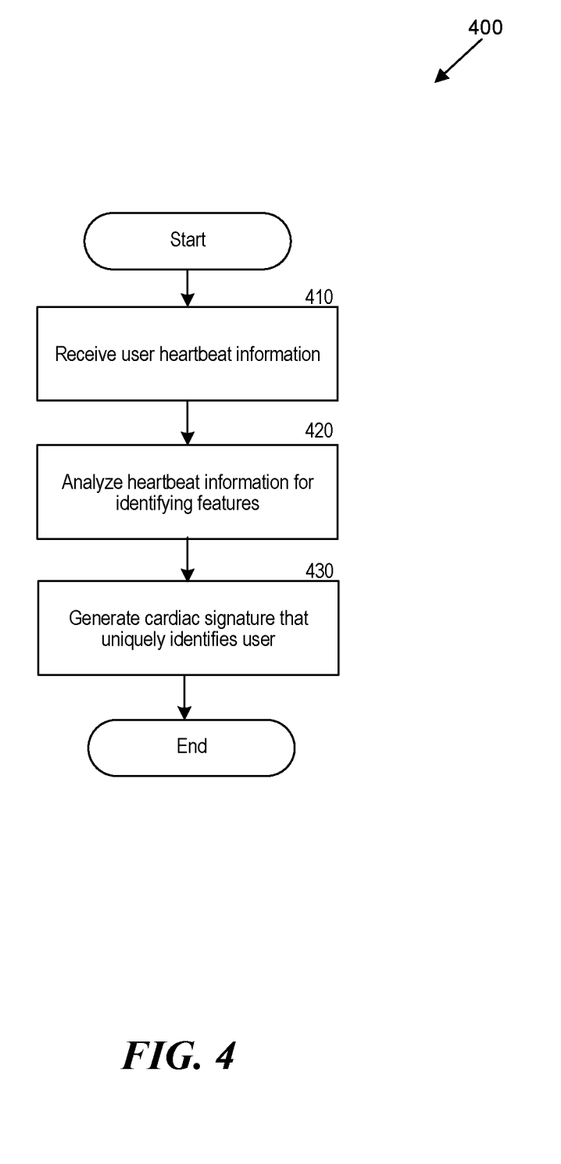
FIG. 4 is a flow diagram illustrating a process for generating a cardiac signature that uniquely identifies a user.

FIG. 4 is a flow diagram illustrating a process 400 for generating a cardiac signature of a user using received heartbeat information. The process 400 can be performed, in whole or in part, for example, by an electronic device 105 and/or server 120, using the cardiac signature generation module 220. The process 400 can be performed using one or more machine learning models trained according to process 300. The process begins at block 410, where heartbeat information is received. The heartbeat information is associated with a known subscriber or other user associated with a telecommunications service provider. The heartbeat information is received from one or more sensors, such as a set of electrodes in contact with the user's skin. For example, the heartbeat information can be detected by a smartwatch that includes at least two electrodes, wherein a first electrode is in contact with the subscriber's wrist and the second electrode is in contact with another part of the subscriber's body, such as a portion of the hand opposite the wrist on which the smartwatch is worn. The received heartbeat information can include, or can be analyzed for, an electrocardiogram (ECG) representing the heartbeat of the subscriber. In some implementations, the heartbeat information additionally or alternatively includes other information, such as PPG information.

The process 400 then proceeds to block 420, where the received heartbeat information is analyzed for identifying features. This analysis can include, for example, processing the ECG for various measured or calculated metrics, based on a P-wave, a Q-wave, a R-wave, a S-wave, a T-wave, and/or a U-wave, and/or one or more complexes, intervals, amplitude relationships, or any combination thereof. Taken together, these identifying features uniquely identify the subscriber such that the subscriber's heartbeat can be differentiated from other individuals' heartbeats.

The process 400 then proceeds to block 430, where the identifying features are used to generate and/or store a cardiac signature uniquely identifying the subscriber. The cardiac signature can then be used to identify the subscriber in received heartbeat information (e.g., an ECG of a heartbeat), as described herein.

Authenticating User Using Cardiac Signature

Figure 5:
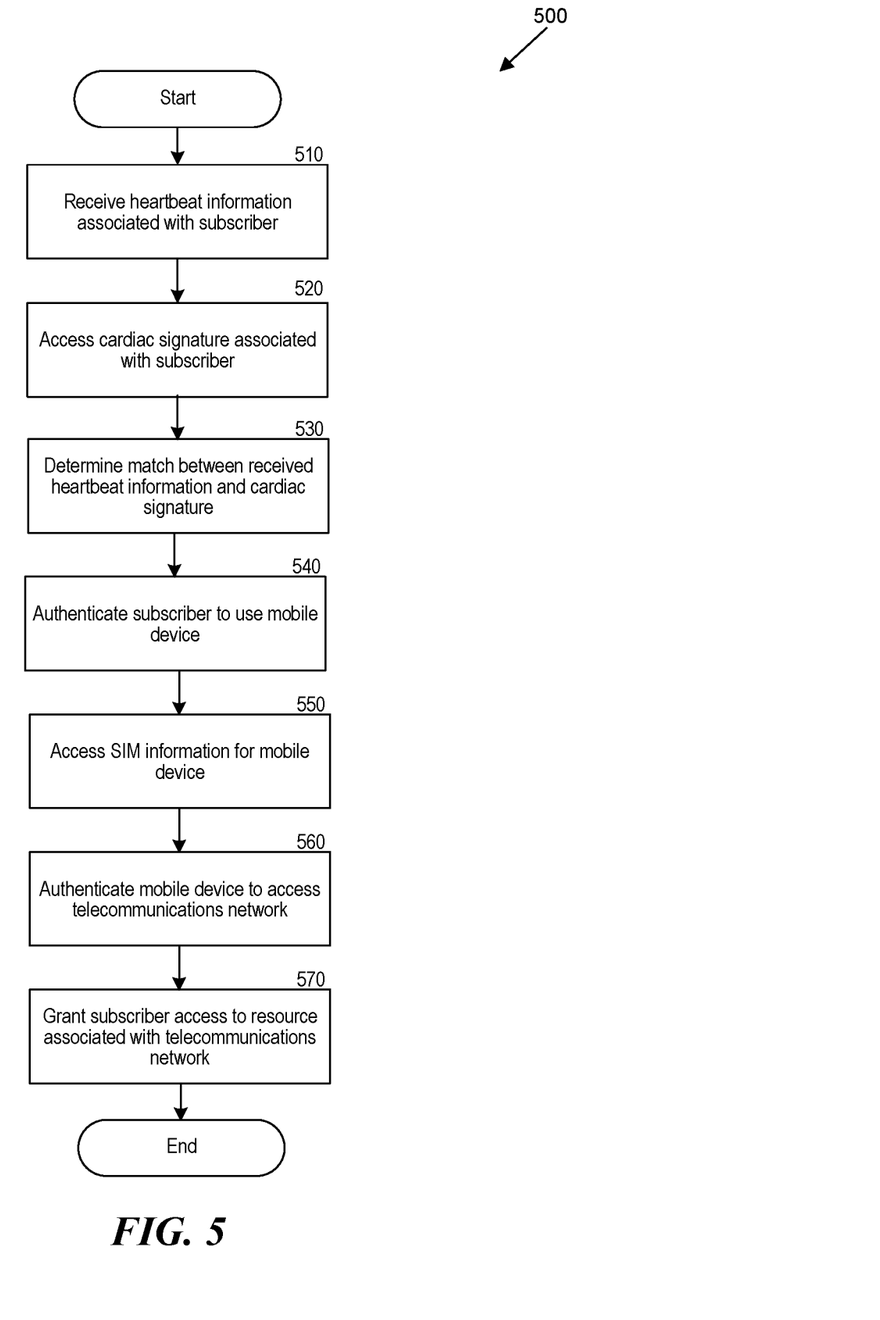
FIG. 5 is a flow diagram illustrating a process for granting access to a resource associated with a telecommunications network by authenticating a subscriber using a cardiac signature and authenticating a mobile device to access the telecommunications network.

FIG. 5 is a flow diagram illustrating a process 500 for granting to a user access to a resource associated with a telecommunications network using a cardiac signature of the user. The process 500 can be performed, for example, in whole or in part, by an electronic device 105 and/or server 120. All or portions of the process 500 can be performed by the heartbeat analysis and signature matching module 230, the user authentication module 250, and/or the network authentication module 260, using one or more machine learning models trained using process 300. In the depicted example, the user is a subscriber of a telecommunications service provider that provides the network. The process 500 begins at block 510, where heartbeat information associated with the subscriber is received. As described herein, the heartbeat information can be, for example, an electric signal or ECG of the subscriber's heartbeat detected using a smartwatch or other electronic device having a heart monitor. The heartbeat information can be received via and/or detected by a mobile device via which the subscriber seeks to access the resource.

The process 500 then proceeds to block 520, where a cardiac signature is accessed associated with the subscriber. The cardiac signature can be stored in a database maintained by a telecommunications service provider that provides the telecommunications network. Additionally or alternatively, the cardiac signature can be stored at a device associated with the subscriber, such as the mobile device, which may include or be communicatively coupled with a wearable device via which the heartbeat information is received. In some implementations, the cardiac signature is one cardiac signature of a set of cardiac signatures. For example, a set of family members, employees, contractors, or other persons can each be authorized to access a resource (e.g., a device or service), and each person in the set can have a stored cardiac signature.

The process 500 then proceeds to block 530, where a match is determined beyond a threshold probability between the heartbeat information received at block 510 and the cardiac signature accessed at block 520. Determining a match can include calculating a probability of a match and determining whether the calculated probability exceeds a threshold probability (e.g., 70%, 80%, 90%). For example, one or more confidence scores can be calculated each reflecting a probability that received heartbeat information is associated with a user based on a stored cardiac signature for the user. A match can be determined when one or more confidence scores exceeds a threshold score.

The process 500 then proceeds to block 540, where, based on the match determined at block 530, the subscriber is authenticated to access the mobile device. In some implementations, the mobile device can be wholly or partially inactivated until the subscriber is authenticated based on the subscriber's cardiac signature. Thus, the authentication performed at block 540 enables hardware and/or software functions of the mobile device such that the subscriber can use them.

The process 500 then proceeds to block 550, where SIM information is accessed for the mobile device. The SIM information comprises, for example, an IMSI and an authentication key.

The process 500 then proceeds to block 560, where the mobile device is authenticated to access the telecommunications network, based on the SIM information identified at block 550.

The process 500 then proceeds to block 570, where, based on the authentications performed at blocks 540 and 560, the subscriber is granted access to the resource associated with the telecommunications network. As described elsewhere herein, the resource can be provided by the telecommunications service provider that provides the network, or the resource can be provided by a third party.

In some implementations, the process 500 or portions thereof can be repeated at periodic intervals (e.g., once a day, twice a day, every hour, every 30 minutes, etc.) such that authentication of the subscriber can be continuously confirmed.

In some implementations, the process 500 can include taking one or more actions to terminate access to the resource and/or disable the mobile device if an authentication fails (e.g., at block 540 or block 560). An authentication may fail, for example, if no heartbeat information is received by the mobile device (e.g., because a device that includes the heartbeat monitor is disconnected or out of range), or received heartbeat information does not match any stored cardiac signature beyond the threshold probability.

In some implementations, multiple cardiac signatures can be identified at block 520. For example, a resource and/or a device by which a subscriber accesses the resource can be associated with a set of authorized users, each user having a cardiac signature that can be matched to heartbeat information. In these and other implementations, the system (e.g., at block 520) identifies cardiac signatures for a set of users authorized to access the resource and/or the device and determines whether the received heartbeat information matches any one of the set of cardiac signatures. In these and other implementations, the system may further associate each cardiac signature in the set of cardiac signatures with different users each associated with respective levels of access. For example, some users may only be authorized to access certain resources, devices, and/or device functions. Thus, the process 500 can include determining a level of access associated with a cardiac signature of the user, and granting or denying access to a device and/or a resource based on the determined level of access.

In some implementations, the process 500 can include performing additional or alternative authentication actions, such as authentication based on passwords, PINs, fingerprint scans, iris scans, facial scans, voice recognition, or other authentication factors such as biometric authentication factors. In some implementations, the process 500 can further include operations for verifying and/or accessing other user information, such as location information, customer information, device information, financial information (e.g., credit information), and so forth.

Although blocks 510-570 are depicted for purposes of illustration as occurring in a series, a person skilled in the art will understand that operations of process 500 can be performed in a different order without deviating from the teachings of the present disclosure, including performing two or more operations in parallel. For example, blocks 510-540 can also be performed after and/or in parallel with blocks 550-570, such that authenticating the user to the device and authenticating the device to the network are performed independently of one another. In some implementations, blocks 550-560 can be optional, and access to resources can be granted based on the authentication performed at block 540 (based on a cardiac signature) alone or in combination with different authentication factors (e.g., based on passwords, PINs, other biometric factors, and so forth).

Computing System

Figure 6:
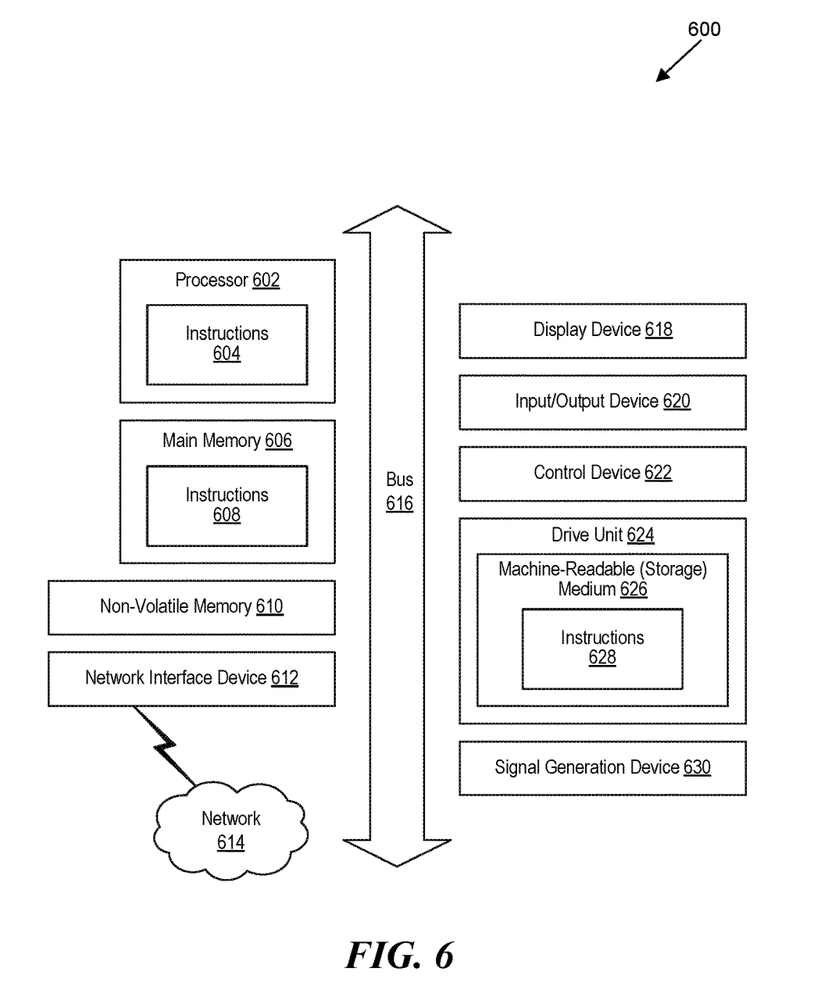
FIG. 6 is a block diagram illustrating an example of a computing system in which at least some operations described herein can be implemented.

FIG. 6 is a block diagram that illustrates an example of a computing system 600 in which at least some operations described herein can be implemented. As shown, the computing system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computing system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computing system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A computer-implemented method to authenticate subscribers of a telecommunications network to access resources associated with the telecommunications network, the method comprising:
    receiving, at a server associated with the telecommunications network, heartbeat information associated with a subscriber of the telecommunications network,
        wherein the heartbeat information is captured by a heart monitor communicatively coupled to a mobile device of the subscriber;
    accessing a cardiac signature of the subscriber of the telecommunications network,
        wherein the cardiac signature uniquely identifies the subscriber of the telecommunications network,
        wherein the cardiac signature includes multiple waves comprising at least two of a P-wave, a Q-wave, a R-wave, a S-wave, and a T-wave, and
        wherein the cardiac signature includes at least one variable value based on a wave interval, a wave amplitude, a wave complex, or any combination thereof;
    determining a match beyond a threshold probability between the received heartbeat information and the accessed cardiac signature of the subscriber of the telecommunications network;
    when the match is determined between the received heartbeat information and the accessed cardiac signature, performing a first authentication,
        wherein the first authentication authorizes the subscriber to use the mobile device;
    receiving subscriber identity module (SIM) information associated with the mobile device;
    based on the received SIM information, performing a second authentication,
        wherein the second authentication authorizes the mobile device to access the telecommunications network; and
    based on the first authentication and the second authentication, granting, to the subscriber of the telecommunications network, access to a resource associated with the telecommunications network.

2. The computer-implemented method of claim 1, wherein the heart monitor that captures the heartbeat information is included in a wearable device communicatively coupled to the mobile device, the method further comprising:
    receiving an indication that the wearable device is no longer communicatively coupled to the mobile device; and performing at least one action comprising terminating the access to the resource, or disabling the mobile device, or both.

3. The computer-implemented method of claim 1, wherein the heart monitor that captures the heartbeat information is included in a wearable device communicatively coupled to the mobile device.

4. The computer-implemented method of claim 1, further comprising:
receiving second heartbeat information;
determining the second heartbeat information and the cardiac signature of the subscriber of the telecommunications network do not match beyond the threshold probability; and
performing at least one action comprising terminating the access to the resource, or disabling the mobile device, or both.

5. The computer-implemented method of claim 1, wherein the resource associated with the telecommunications network is provided by a third-party service, and wherein the cardiac signature includes a QRS complex.

6. The computer-implemented method of claim 1, further comprising:
receiving at least one additional authentication factor comprising: a subscriber fingerprint scan, a password, a personal identification number (PIN), a subscriber facial scan, a subscriber iris scan, or any combination thereof; and
performing a third authentication based on the at least one additional authentication factor.

7. The computer-implemented method of claim 1, wherein granting to the subscriber of the telecommunications network access to the resource associated with the telecommunications network comprises:
determining a level of access for which the subscriber is authorized; and
excluding the subscriber from access to a resource that is determined to be outside of the determined level of access.

8. The computer-implemented method of claim 1, wherein accessing a cardiac signature of the subscriber of the telecommunications network includes:
identifying the cardiac signature from a set of cardiac signatures,
wherein each cardiac signature in the set of cardiac signatures is associated with a subscriber authorized to use the mobile device, and
wherein each subscriber is associated with a level of access; and
determining a level of access for the subscriber associated with the cardiac signature.

9. The computer-implemented method of claim 1, wherein accessing a cardiac signature of the subscriber of the telecommunications network includes identifying the cardiac signature from a set of cardiac signatures.

10. At least one computer-readable medium, excluding transitory signals, carrying instructions that, when executed by a computing system, cause the computing system to perform operations for granting user access to resources associated with a telecommunications network, the operations comprising:
receive, at a mobile device of a user, heartbeat information associated with the user,
wherein the heartbeat information is captured by a sensor communicatively coupled to the mobile device;
access a set of user cardiac signatures,
wherein each cardiac signature in the set of cardiac signatures includes a QRS complex, and
wherein the QRS complex includes interval information, amplitude information, a morphological feature, or any combination thereof;
determine a match beyond a threshold probability between the received heartbeat information and a user cardiac signature of the set of user cardiac signatures;
when the match is determined between the received heartbeat information and the user cardiac signature of the set of user cardiac signatures, perform a first authentication,
wherein the first authentication authorizes the user to access at least one hardware or software function of the mobile device;
access subscriber identity module (SIM) information associated with the mobile device;
based on the SIM information, perform a second authentication,
wherein the second authentication authorizes the mobile device to access the telecommunications network; and
based on the first authentication and the second authentication, grant, to the user, access to the resource associated with the telecommunications network.

11. The at least one computer-readable medium of claim 10, wherein the sensor that captures the heartbeat information is included in a wearable device communicatively coupled to the mobile device, wherein the operations further comprise:
determine the wearable device is no longer communicatively coupled to the mobile device; and
perform at least one action comprising terminating the access to the resource, or disabling at least one hardware or software function of the mobile device, or both.

12. The at least one computer-readable medium of claim 10, wherein the sensor that captures the heartbeat information is included in a wearable device communicatively coupled to the mobile device.

13. The at least one computer-readable medium of claim 10, wherein the operations further comprise:
receive second heartbeat information;
determine the second heartbeat information and each of the set of user cardiac signatures do not match beyond the threshold probability; and
perform at least one action comprising terminate the access to the resource, or disable at least one hardware or software function of the mobile device, or both.

14. The at least one computer-readable medium of claim 10, wherein the resource associated with the telecommunications network is provided by a third-party service.

15. The at least one computer-readable medium of claim 10, wherein the operations further comprise:
receive at least one additional authentication factor comprising: a user fingerprint scan, a password, a personal identification number (PIN), a user facial scan, a user iris scan, or any combination thereof; and
perform a third authentication based on the at least one additional authentication factor.

16. The at least one computer-readable medium of claim 10, wherein granting to the user access to the resource associated with the telecommunications network further causes the computing system to:
determine a level of access for which the user is authorized; and
exclude the user from access to a resource that is determined to be outside of the determined level of access.

17. The at least one computer-readable medium of claim 10, wherein each user cardiac signature in the set of user cardiac signatures is associated with a level of access, wherein the operations further comprise:
  determine a level of access for the user associated with the cardiac signature.

18. A computing system, comprising:
  at least one processor; and
  at least one non-transitory memory carrying instructions that, when executed by the at least one processor, cause the computing system to perform operations comprising:
    receive, at a server associated with a telecommunications network, heartbeat information associated with a user,
      wherein the heartbeat information is captured by a sensor communicatively coupled to a mobile device of the user;
    access a set of user cardiac signatures,
      wherein each cardiac signature in the set of cardiac signatures includes a P-wave, a Q-wave, a R-wave, a S-wave, and a T-wave;
    determine a match beyond a threshold probability between the received heartbeat information and a user cardiac signature of the set of user cardiac signatures;
    when the match is determined between the received heartbeat information and the user cardiac signature of the set of user cardiac signatures, perform a first authentication,
      wherein the first authentication authorizes the user to access at least one hardware or software function of the mobile device;
    receive subscriber identity module (SIM) information associated with the mobile device;
    based on the SIM information, perform a second authentication,
      wherein the second authentication authorizes the mobile device to access the telecommunications network; and
    based on the first authentication and the second authentication, grant, to the user, access to the resource associated with the telecommunications network.

19. The computing system of claim 18, wherein the sensor that captures the heartbeat information is included in a wearable device communicatively coupled to the mobile device.

20. The computing system of claim 18, wherein the resource associated with the telecommunications network is provided by a third-party service.

* * * * *